Aug. 3, 1926.
K. R. MANVILLE
PISTON
Filed Nov. 29, 1922
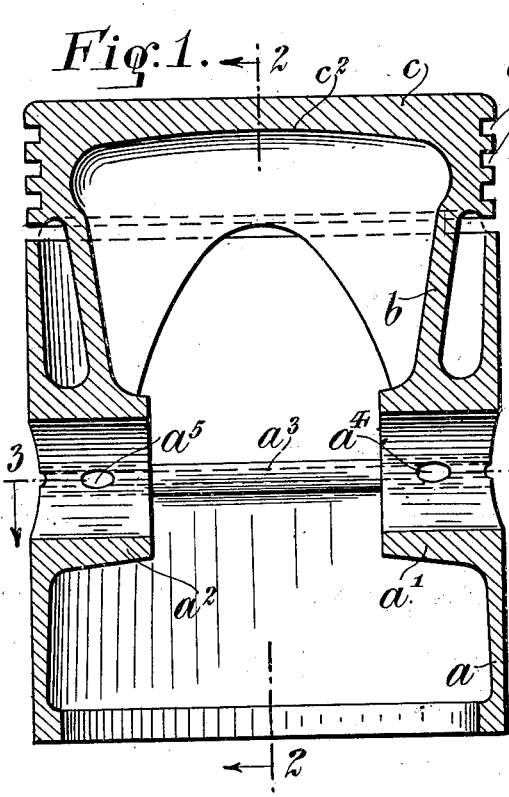
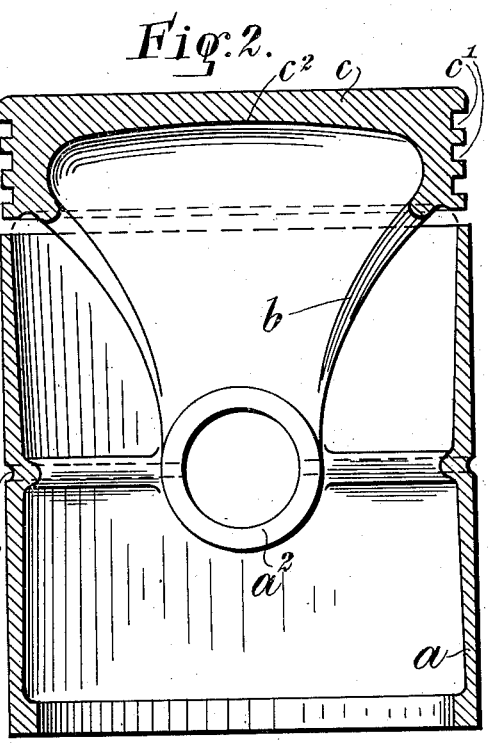
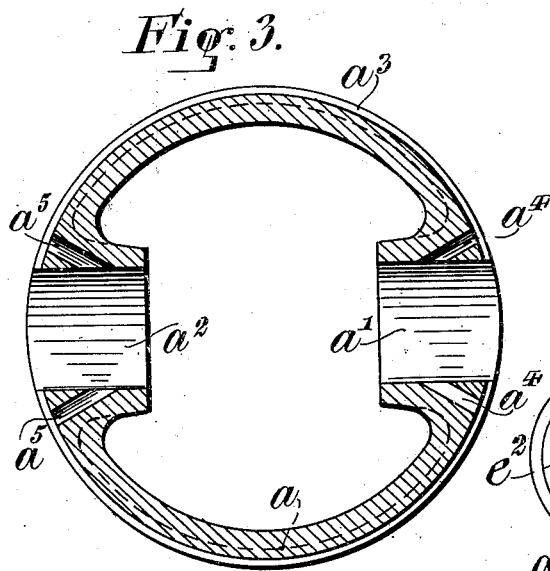
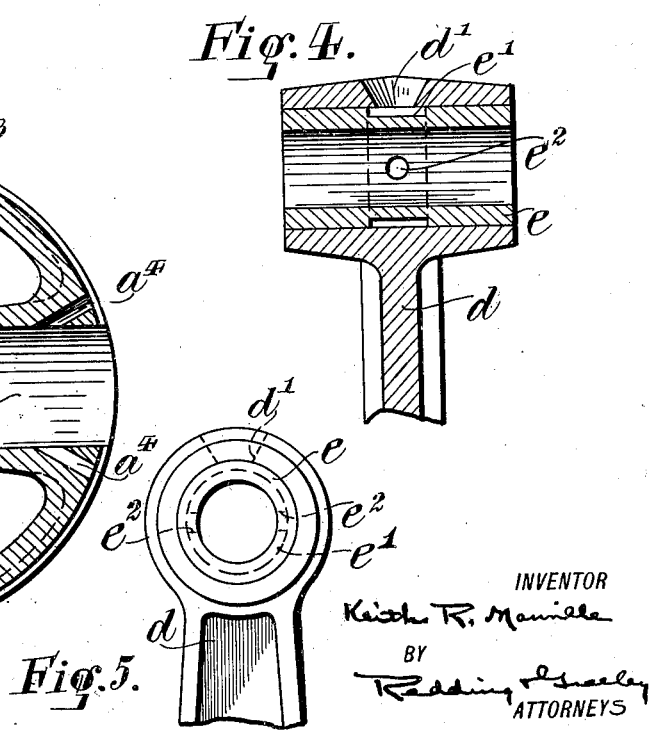
INVENTOR
Keith R. Manville
BY
Redding & Greeley
ATTORNEYS Patented Aug. 3, 1926.

1,594,893

UNITED STATES PATENT OFFICE.

KEITH R. MANVILLE, OF BROOKLYN, NEW YORK, ASSIGNOR TO INTERNATIONAL MOTOR COMPANY, OF NEW YORK, N. Y., A CORPORATION OF DELAWARE.

PISTON.

Application filed November 29, 1922. Serial No. 603,897.

This invention relates to pistons especially designed for use in internal combustion engines and has for its general objects to provide a piston in which the skirt portion proper shall be kept relatively cool and relieved from a great portion of the heat usually transferred thereto by conduction from the piston head, and in which provision is made for preventing the passage of oil from the crank-case to the cylinder and for effectively lubricating the wrist pin and its bushing in the pitman. More particularly, the invention proposes to form a piston with an outer skirt which bears on the cylinder wall and what may be termed an inner skirt carried thereby and supporting the piston head which is separated from the skirt. The support for the piston head may be termed an inner skirt and may be joined with the head at a point below the rings so that the heat from the head may be dissipated to a large extent through the rings before being transferred to the support for the head. For the purpose of securing effective lubrication the skirt is formed with a circumferential groove which collects the oil and conducts it through inclined horizontal passages to the wrist pin, while the wrist pin bushing is so constructed and disposed with respect to the piston head as to receive oil therefrom and conduct it through horizontal passages to the wrist pin.

The invention will be described with reference to the preferred embodiment which is illustrated in the accompanying drawings and in which:

Figure 1 is a view in vertical section through a piston embodying the improvements.

Figure 2 is a view in section taken on the plane indicated by the line 2—2 of Figure 1 and looking in the direction of the arrows.

Figure 3 is a view in horizontal section through the piston shown in Figure 1 and taken on the plane indicated by the line 3—3 of Figure 1 and looking in the direction of the arrows.

Figure 4 is a fragmentary detail view in section of the wrist pin bushing and showing its relation to the pitman.

Figure 5 is a view in end elevation of the parts shown in Figure 4.

The piston is constructed with what will hereinafter be termed the outer skirt $a$ on which is carried what will hereinafter be termed an inner skirt $b$ which supports the piston head $c$ in spaced relationship to the skirt $a$. Grooves $c'$ in the head will receive piston rings for engagement with the walls of the cylinder in accordance with established practice and it is to be noted particularly that the inner skirt $b$ is united with the head $c$ at a point below these rings so that it will be relieved from the great amount of heat which is dissipated through the rings. The inner skirt $b$ is spaced from the outer skirt $a$ and united with the bearings $a'$, $a^2$, for the wrist pin, the construction being such that heat conveyed by conduction from the head $c$ must traverse a relatively long path before reaching the skirt $a$. In this way, the skirt is kept comparatively cool and its diameter is practically invariable so that a smooth sliding engagement is always maintained with the cylinder wall against which it bears.

In the improved piston effective means are incorporated for insuring adequate lubrication of the wrist pin and for preventing the leakage of oil from the crank-case to the cylinder. As shown, the skirt $a$ is provided with a circumferential groove $a^3$ which collects the oil on the cylinder wall and conducts it to horizontal inclined passages $a^4$, $a^5$, which extend through the respective bearings $a^1$, $a^2$, and discharge the oil onto the wrist pin which is journaled therein. By disposing the ducts $a^4$, $a^5$, horizontally the inertia impressed on the oil through reciprocations of the pistons is rendered negligible as a factor in the oil feed so that no pumping action results when the piston changes direction. Further, since the wrist pin bears with greatest pressure at the upper and lower sides of the bearings $a'$, $a^2$, depending upon whether the piston is travelling up or down the conditions at the opposite sides of the pin remain practically uniform and insure the delivery of oil onto the sides uniformly at all times.

The pitman $d$ carries therein a bushing $e$ through which the wrist pin extends and has formed in the upper wall of its bearing for the bushing an oil pocket $d'$ into which oil may drop from the piston head. The under surface of the piston head $c$ is formed concave as indicated at $c^2$ so that the inertia of the piston when travelling downwards will cause the oil to collect adjacent its center in an appreciable quantity. When the piston travels upwards the oil thus collected will be shaken off and dropped in ample portions into the pocket $d'$. The bushing $e$ is formed with a circumferential groove $e'$ which communicates with the pocket $d'$ and conducts oil therefrom through horizontal ducts $e^2$ to the wrist pin. By this construction the same advantages are obtained as were pointed out heretofore with reference to the horizontal oil ducts $a^4$, $a^5$. The oil is relieved from the inertia incidental to the changes of speed of the piston and is led uniformly around the channel $e'$ and through the ducts $e^2$ onto the piston pin.

Changes in details of design may be made without departing from the spirit of the invention.

What I claim is:

In combination with a piston head having a concave inner surface, a wrist pin and connecting rod having an oil pocket disposed beneath the apex of the inner surface, a bearing for the connecting rod and a bushing disposed within the bearing and having a circumferential groove communicating with the oil pocket, said groove communicating with the wrist pin through a horizontal duct, whereby pumping action on the oil feed due to reciprocation, is relieved.

This specification signed this 24th day of November A. D. 1922.

KEITH R. MANVILLE.